United States Patent [19]
Sakai et al.

[11] Patent Number: 5,951,115
[45] Date of Patent: Sep. 14, 1999

[54] BRAKE CONTROL SYSTEM FOR AN ELECTRICALLY OPERATED VEHICLE

[75] Inventors: Toshiyuki Sakai, Kariya; Masamoto Ando, Toyota; Naoyasu Enomoto, Handa; Shingo Urababa; Harumi Ohori, both of Toyota, all of Japan

[73] Assignees: Aisin Seiki Kabushiki Kaisha, Kariya, Japan; Toyota Jidosha Kabushiki Kaisha, Toyota, Japan

[21] Appl. No.: 08/903,308

[22] Filed: Jul. 30, 1997

[30] Foreign Application Priority Data

Jul. 31, 1996 [JP] Japan ................................. 8-219474

[51] Int. Cl.$^6$ ....................................................... B60T 13/74
[52] U.S. Cl. ................................................. 303/3; 303/152
[58] Field of Search ............................. 303/3, 152, 113.5, 303/119.1, 115.1, 115.2, 114.1, 114.3, 116.2, 186, 188, 9.62

[56] References Cited

U.S. PATENT DOCUMENTS

| | | |
|---|---|---|
| 5,253,929 | 10/1993 | Ohori . |
| 5,568,962 | 10/1996 | Enomoto et al. ........................... 303/3 |
| 5,882,093 | 3/1999 | Enomoto et al. ....................... 303/152 |

FOREIGN PATENT DOCUMENTS

| | | |
|---|---|---|
| 5-176406 | 7/1993 | Japan . |
| 7-336806 | 12/1995 | Japan . |

Primary Examiner—Robert J. Oberleitner
Assistant Examiner—Melanie Talavera
Attorney, Agent, or Firm—Burns, Doane, Swecker & Mathis, LLP

[57] ABSTRACT

The present invention is directed to a brake control system for an electrically operated vehicle which is adapted to add a hydraulic braking operation to a regenerative braking operation, or change the former for the latter, rapidly and smoothly. An electric motor is operatively connected to a wheel for rotating the wheel, and a motor control unit for controlling the electric motor to apply a rotating force and a regenerative braking force to the wheel. In a main passage for connecting a master cylinder with a wheel brake cylinder, a pressure limit changeover device is disposed. The changeover device includes a first pressure limit device which is adapted to close the main passage when a master cylinder pressure is lower than a first predetermined pressure, and open the main passage when the master cylinder pressure exceeds the first predetermined pressure, and a second pressure limit device which is adapted to close the main passage when the master cylinder pressure is lower than a second predetermined pressure which is lower than the first predetermined pressure, and open the main passage when the master cylinder pressure exceeds the second predetermined pressure. First and second valve devices for opening or closing the main passage are connected to the main passage in parallel with the first pressure limit device, and the second valve device is connected in series of the second pressure limit device.

9 Claims, 7 Drawing Sheets

BRAKE CONTROL SYSTEM FOR AN ELECTRICALLY OPERATED VEHICLE

BACKGROUND OF THE INVENTION

1. Field of the Invention

The present invention relates to a brake control system for an electrically operated vehicle to perform a regenerative braking operation and a hydraulic braking operation, and more particularly to the brake control system which is adapted to add the hydraulic braking operation to the regenerative braking operation, or change the former for the latter.

2. Description of the Related Arts

In an electrically operated vehicle provided with an electric motor as a power source, the electric motor also functions as a generator for performing the regenerative braking operation to recover energy by charging a battery and use the energy for driving the motor. Since the braking force applied to the vehicle wheels through the regenerative braking operation is limited, it must be compensated by a hydraulic braking operation. Therefore, both of the regenerative braking operation and the hydraulic braking operation are performed, in general. In Japanese Patent Laid-open Publication No. 5-176406, for example, a brake control apparatus is proposed to perform a proper braking control which is adapted to comply with a difference between the maximum regenerative braking force which is provided when a vehicle travels at a relatively high speed and the maximum regenerative braking force which is provided when the vehicle travels at a relatively low speed. The apparatus includes a plurality of cut-off means which are disposed in series on a pressure transmitting passage for communicating a pressure generator to a wheel cylinder operatively mounted on a driven wheel, to shut off the hydraulic pressure generated by the pressure generator until it reaches a predetermined value. The apparatus further includes communication changeover means for selectively bypassing the cut-off means in response to a rotational speed of a motor to change the communication between the cut-off means. In practice, when the vehicle travels at the relatively high speed, the hydraulic braking operation is made to provide the hydraulic pressure corresponding to a difference $\Delta P$ exceeding a certain pressure to enable only a pressure decreasing valve 30 to be opened. When the vehicle travels at the relatively low speed, the hydraulic braking operation is made to provide the hydraulic pressure corresponding to the difference $\Delta P$ exceeding a certain pressure to enable both of the pressure decreasing valves 30 and 32 to be opened.

According to a brake apparatus disclosed in Japanese Patent Laid-open Publication No. 7-336806, an ON/OFF valve is disposed between the master cylinder and the wheel brake cylinder, and closed when the regenerative braking operation is performed. In the Publication, it was raised as an issue to be solved that a brake pedal was moved forward to vary the depressing force, when the ON/OFF valve was switched from its closed condition to its open condition so as to cancel a mode for giving a priority to the regenerative braking operation. Therefore, the brake apparatus was proposed to rapidly increase the pressure in a hydraulic braking device by temporarily introducing a hydraulic pressure from a hydraulic booster. When the braking operation is switched from the regenerative braking operation to the hydraulic braking operation, the master cylinder pressure is temporarily reduced until the wheel cylinder pressure is increased close to the master cylinder pressure, so that the stroke of the brake pedal is rapidly varied and the vibration of the depressing force occurs to deteriorate the brake pedal feeling, as described in the Publication No. 7-336806. According to the apparatus proposed in the Publication, when the difference of the pressure between relief valves (VR1), (VR2) is to be cleared, a solenoid valve (V1) is closed at the outset and subsequently a solenoid valve (V4) is opened to temporarily introduce the hydraulic pressure from a hydraulic booster (HB), so as to prevent a large pressure difference from being caused between the master cylinder pressure and the wheel cylinder pressure.

According to the apparatus proposed in the Publication No. 5-176406, however, the hydraulic braking operation is made to provide the hydraulic pressure corresponding to the difference $\Delta P$ exceeding the pressure to enable both of the pressure decreasing valves 30 and 32 to be opened, and a pair of pressure decreasing valves are arranged in series, so that its response characteristic is to be improved.

According to the apparatus proposed in the Publication No. 7-336806, the hydraulic booster (HB) included in a dynamic pressure circuit is connected to a static pressure circuit between the master cylinder and the wheel brake cylinder through the solenoid valve (V4). The static pressure circuit includes the relief valve (VR2) for use in adding the hydraulic braking operation to the regenerative braking operation or changing the former for the latter, a solenoid valve (V5) and a check valve (VC2). Therefore, when the hydraulic braking operation is changed for the regenerative braking operation, brake fluid is supplied from the hydraulic booster (HB) to the static pressure circuit, so that the brake fluid in the static pressure circuit is not compensated, even if a brake pedal is depressed. As a result, a feeling of a vehicle driver in his braking operation will be deteriorated.

SUMMARY OF THE INVENTION

Accordingly, it is an object of the present invention to provide a brake control system for an electrically operated vehicle which is adapted to add a hydraulic braking operation to a regenerative braking operation, or change the former for the latter, rapidly and smoothly.

And, it is another object of the present invention to provide a brake control system for an electrically operated vehicle which is provided with a static pressure generator and a dynamic pressure generator, and improve the feeling of the vehicle driver in starting a pressure decreasing operation by means of the hydraulic pressure generated by the dynamic pressure generator.

In accomplishing the above and other objects, a brake control system is provided for controlling a braking force applied to a wheel of an electrically operated vehicle. The brake control system includes an electric motor operatively connected to the wheel for rotating the wheel, and a motor control unit for controlling the electric motor to apply a rotating force to the wheel and apply a regenerative braking force to the wheel. A pressure generator is provided for pressurizing brake fluid in response to operation of a manually operated member to generate a hydraulic pressure. A wheel brake cylinder is operatively connected to the wheel for applying a hydraulic braking force to the wheel in response to at least the hydraulic pressure supplied thereto from the pressure generator. A main passage is provided for communicating the pressure generator with the wheel brake cylinder. A pressure limit changeover device is disposed in the main passage for selectively providing one of at least a first pressure limit condition where the hydraulic pressure supplied from the pressure generator to the wheel brake cylinder is controlled to be lower than the hydraulic pressure generated by the pressure generator when the motor control unit controls the electric motor to apply the regenerative braking force to the wheel, and a second pressure limit condition where the hydraulic pressure supplied from the pressure generator to the wheel brake cylinder is controlled to be substantially equal to the hydraulic pressure generated by the pressure generator when the motor control unit controls the electric motor not to apply the regenerative braking force to the wheel. The pressure limit changeover device includes a first pressure limit device connected to the main passage for closing the main passage when the hydraulic pressure generated by the pressure generator is lower than a first predetermined pressure, and opening the main passage when the hydraulic pressure generated by the pressure generator exceeds the first predetermined pressure, a second pressure limit device connected to the main passage in parallel with the first pressure limit device for closing the main passage when the hydraulic pressure generated by the pressure generator is lower than a second predetermined pressure which is lower than the first predetermined pressure, and opening the main passage when the hydraulic pressure generated by the pressure generator exceeds the second predetermined pressure, a first valve device connected to the main passage in parallel with the first pressure limit device for opening or closing the main passage, and a second valve device connected to the main passage in parallel with the first pressure limit device and in series of the second pressure limit device for opening or closing the main passage.

Preferably, the above-described brake control system further includes a vehicle speed detection device for detecting a vehicle speed of the electrically operated vehicle, so that at least the second valve device opens or closes the main passage in response to the vehicle speed detected by the vehicle speed detection device. Or, the above-described brake control system may further include a braking force detection device for detecting the regenerative braking force applied by the electric motor to the wheel, so that at least the second valve device opens or closes the main passage in response to the regenerative braking force applied to the wheel and detected by the braking force detection device.

In the above-described brake control system, the pressure generator may comprise an auxiliary power source for pressurizing the brake fluid stored in the reservoir irrespective of operation of the manually operated member to generate a power pressure, a dynamic pressure generator for regulating the power pressure in response to operation of the manually operated member to generate a dynamic hydraulic pressure, and a static pressure generator for pressurizing the brake fluid stored in the reservoir in response to operation of the manually operated member to generate a static hydraulic pressure. Then, it may be so arranged that the first pressure limit device closes the main passage when the static hydraulic pressure generated by the static pressure generator is lower than the first predetermined pressure, and opens the main passage when the static hydraulic pressure generated by the static pressure generator exceeds the first predetermined pressure, and the second pressure limit device closes the main passage when the static hydraulic pressure generated by the static pressure generator is lower than the second predetermined pressure, and opens the main passage when the static hydraulic pressure generated by the static pressure generator exceeds the second predetermined pressure.

Preferably, this brake control system further includes an auxiliary passage for fluidly connecting the dynamic pressure generator to the main passage between the pressure limit changeover device and the wheel brake cylinder, and a third valve device which is disposed in the auxiliary passage for opening or closing the auxiliary passage, and adapted to open the auxiliary passage at least when a first condition for applying the regenerative braking force to the wheel is changed to a second condition for applying the hydraulic braking force to the wheel. In this brake control system, the second valve device is preferably connected to the main passage in the downstream of the second pressure limit device.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
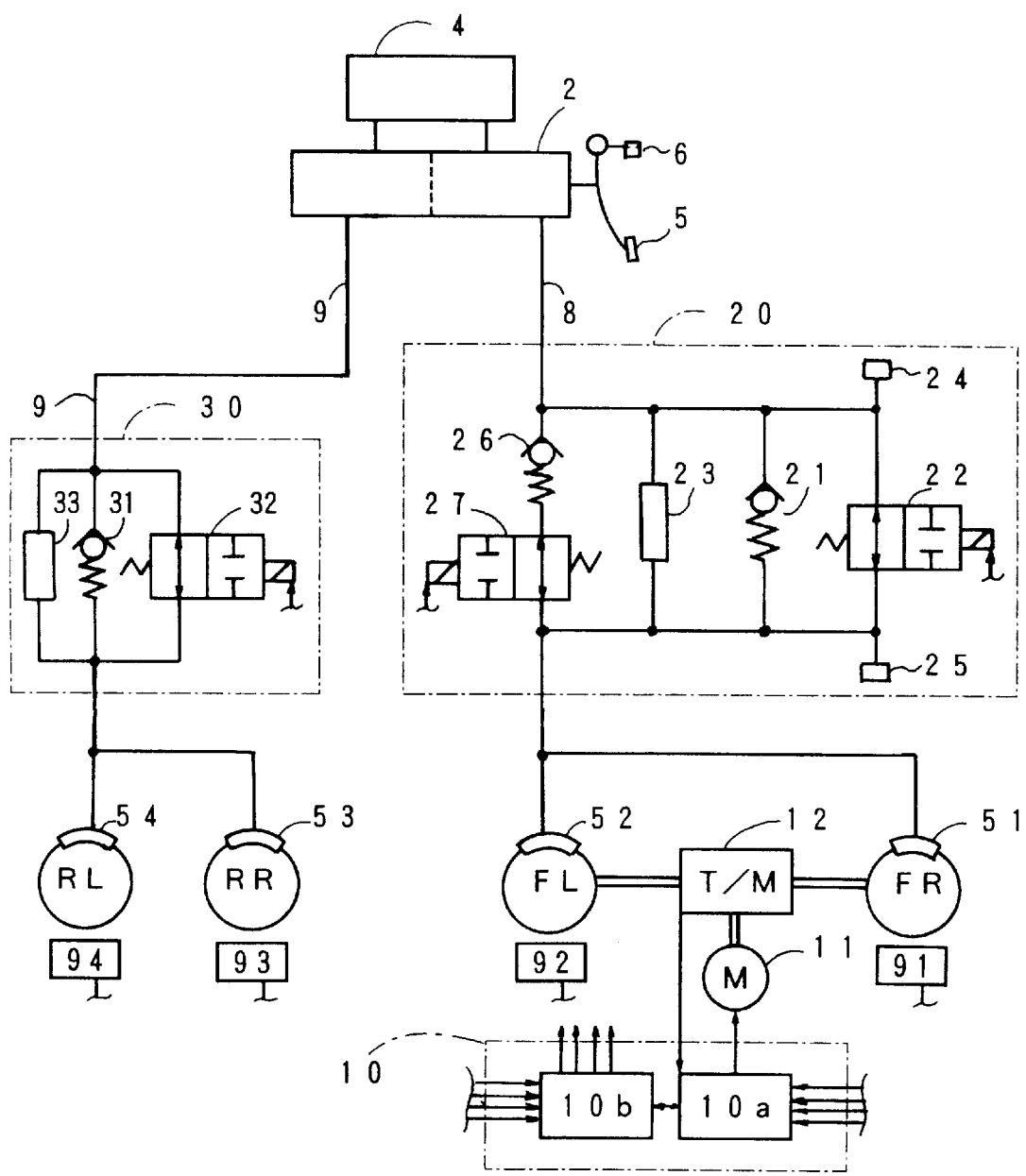
FIG. 1 is a block diagram illustrating a brake control system for an electrically operated vehicle according to a first embodiment of the present invention.

Referring to FIG. 1, there is schematically illustrated a brake control system for an electrically operated vehicle according to a first embodiment of the present invention, which includes a brake control system having an electric motor 11 for performing the regenerative braking operation and a hydraulic pressure control apparatus for performing a hydraulic braking operation. The hydraulic pressure control apparatus has a master cylinder 2 which serves as a static pressure generator, and which is operated in response to depression of a brake pedal 5. Referring to FIG. 1, wheel brake cylinders 51, 52, 53, 54 are operatively mounted on wheels (FR), (FL), (RR), (RL) to apply braking force thereto, respectively. The wheel (FR) designates a wheel at the fore right side as viewed from the position of a driver's seat, the wheel (FL) designates a wheel at the fore left side, the wheel (RR) designates a wheel at the rear right side, and the wheel (RL) designates a wheel at the rear left side. According to the present embodiment, a front and rear dual-circuit system has been employed to divide the circuit into a front pressure circuit and a rear pressure circuit.

According to the present embodiment, a front drive system has been employed, so that the front wheels (FR), (FL) are driven, and the rear wheels (RR), (RL) are not driven.

The front wheels (FR), (FL) are connected to the electric motor 11 through a transmission 12. The electric motor 11 is controlled by an electronic control unit 10 which includes a microcomputer 10a for controlling the electric motor 11, which serves as a motor control unit, and a microcomputer 10b for controlling the hydraulic braking pressure, which serves as a hydraulic control unit. The basic structure of each microcomputer is similar to the one disclosed in the prior publication such as the aforementioned Publication No. 7-336806, so that further explanation is omitted. The electric motor 11 used in the present embodiment is an induction motor having a rotor with permanent magnets for providing magnetic poles, and a stator with three-phase wires to which A.C. power is fed to generate a magnetic field for rotating the rotor. Therefore, a drive circuit (not shown) controlled by the microcomputer is provided with a plurality of inverters (not shown). When the rotor of the electric motor 11 is rotating in accordance with the rotation of the wheels (FR), (FL), the electric motor 11 can be braked by generating a magnetic field for preventing the rotor from rotating. The electric power generated in the stator is recovered to charge a battery (not shown) thereby to brake the wheels, i.e., to perform the regenerative braking operation.

Referring to FIG. 1, the master cylinder 2 is of a tandem type having a couple of pressure chambers, and connected to a low-pressure reservoir 4 for storing brake fluid therein. In a main passage 8 which communicates one of the pressure chambers of the master cylinder 2 with the front wheel brake cylinders 51, 52, a pressure limit changeover device 20 is disposed to add the hydraulic braking operation to the regenerative braking operation, and change the former for the latter. In a main passage 9 which communicates the other one of the pressure chambers of the master cylinder 2 with the rear wheel brake cylinders 53, 54, is disposed a pressure limit changeover device 30 which is slightly different from the pressure limit changeover device 20, as described later.

In the pressure limit changeover device 20, a first relief valve 21 which serves as a first pressure limit device, a solenoid valve 22, a proportioning valve 23, and a second relief valve 26 which serves as a second pressure limit device, are arranged in parallel with each other. Furthermore, a solenoid valve 27 is disposed in series with the second relief valve 26. The first relief valve 21 is adapted to operate in such a manner that it is held to close the main passage 8 until the hydraulic pressure generated by the master cylinder 2, i.e., master cylinder pressure, reaches a predetermined pressure "Pc", and actuated to open the main passage 8 when the master cylinder pressure exceeds the predetermined pressure "Pc". The second relief valve 26 is adapted to operate in such a manner that it is held to close the main passage 8 until the master cylinder pressure reaches a predetermined pressure "Pb" which is lower than the predetermined pressure "Pc", and actuated to open the main passage 8 when the master cylinder pressure exceeds the predetermined pressure "Pb".

The solenoid valve 22 is controlled by the electronic control unit 10 to be opened or closed in response to a maximum regenerative braking force. Also, the solenoid valve 27 is controlled by the electronic control unit 10 to be opened or closed in response to the maximum regenerative braking force, more particularly in response to a maximum vehicle speed or a maximum regenerative braking torque. The proportioning valve 23 has such a characteristic that the master cylinder pressure is increased in response to depression of the brake pedal 5 to supply it to the wheel brake cylinders 51, 52. The proportioning valve 23 has substantially the same structure as that of a conventional proportioning valve for use in a front-rear braking force distribution control, but has a break point in its input-output characteristic to be set at a lower pressure than the conventional proportioning valve, which will be described later in detail. A pair of pressure sensors 24, 25 are connected to the upstream and downstream of the first relief valve 21 and the solenoid valve 22, respectively.

The pressure limit changeover device 30 provided for the rear pressure circuit includes a relief valve 31, a solenoid valve 32 and a proportioning valve 33 which are disposed in parallel with one another. It does not include those corresponding to the second relief valve 26 and the solenoid valve 27, but may include them. The relief valve 31 operates in such a manner that it is held to close the main passage 9 until the master cylinder pressure reaches a predetermined pressure "Pc", and actuated to open the main passage 9 when the master cylinder pressure exceeds the predetermined pressure "Pc". The solenoid valve 32 is controlled to be opened or closed in response to the regenerative braking force in substantially the same manner as the solenoid valve 22, and the proportioning valve 33 functions in substantially the same manner as the proportioning valve 23.

Figure 7:
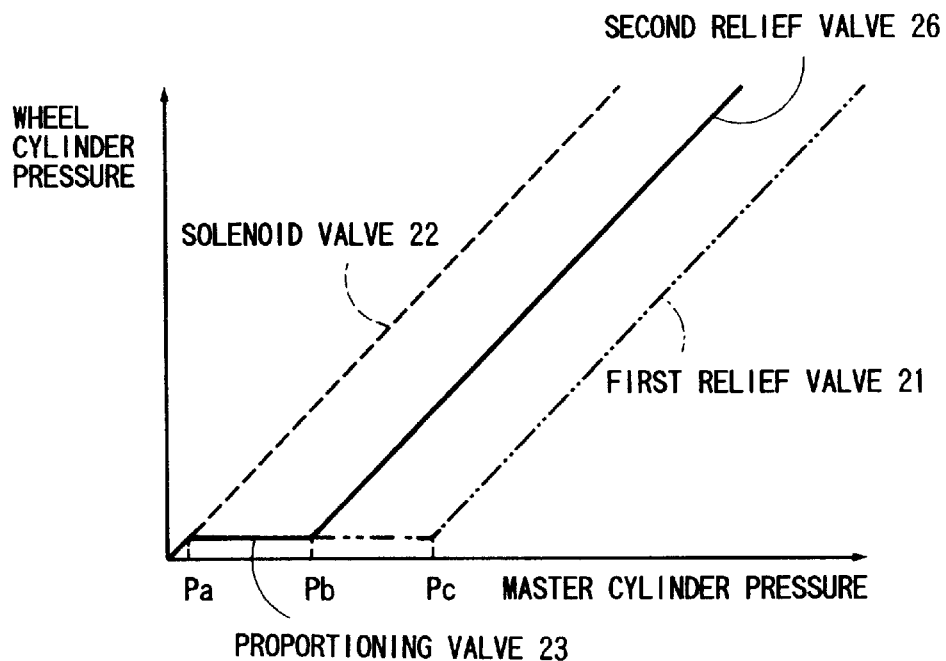
FIG. 7 is a diagram showing a relationship between a master cylinder pressure and a wheel cylinder pressure with respect to first and second relief valves, proportioning valve and solenoid valve in a pressure limit changeover device according to the embodiments of the present invention.

The first relief valve 21, solenoid valve 22 and proportioning valve 23 in the pressure limit changeover device 20 have such characteristics as shown in FIG. 7. The proportioning valve 23 has such a characteristic that the master cylinder pressure is increased in response to depression of the brake pedal 5 when the braking operation started, so that the hydraulic pressure in the wheel cylinder, i.e., wheel cylinder pressure, is increased in proportion to the increase of the master cylinder pressure. When the wheel cylinder pressure reaches a predetermined pressure "Pa", the wheel cylinder pressure is held to be substantially constant, and thereafter it will be increased by a small amount in response to the increase of the stroke of the brake pedal 5. The predetermined pressure "Pa" is set as low as a value which enables the brake fluid to be fulfilled in the wheel brake cylinders so as to cause a brake pad (not shown) to abut on a rotor (not shown). Thus, the proportioning valve 23 has various functions such as a function for fulfilling the brake fluid in the brake system at the start of the braking operation, a function for blocking the pressure until the relief valve 21 operates, and a function for returning the brake fluid from the wheel brake cylinders 51 and etc. to the master cylinder 2.

The first relief valve 21 operates in such a manner that it is closed until the master cylinder pressure reaches a predetermined pressure "Pc", as shown by a two-dotted chain line in FIG. 7 and opened when the master cylinder pressure exceeds the predetermined pressure "Pc", and thereafter the wheel cylinder pressure is increased in proportion to the increase of the master cylinder pressure. The second relief valve 26 operates in such a manner that it is closed until the master cylinder pressure reaches a predetermined pressure "Pb", which is lower than the predetermined pressure "Pc", as shown by a solid line in FIG. 7 and opened when the master cylinder pressure exceeds the predetermined pressure "Pb", and thereafter the wheel cylinder pressure is increased in proportion to the increase of the master cylinder pressure. The solenoid valve 27 is provided for controlling the operation of the second relief valve 26, while the solenoid valve 22 has such a characteristic that the wheel cylinder pressure corresponds to the master cylinder pressure when the solenoid valve 22 is placed in its open position, as indicated by a broken line in FIG. 7. In other words, a dotted zone in FIG. 7 surrounded by the broken line indicating the characteristic of the solenoid valve 22, and solid lines indicating the characteristics of the first relief valve 21 or the second relief valve 26, and the proportioning valve 23, is a pressure decreasing zone, where the regenerative braking operation is to be performed in lieu of the hydraulic braking operation.

As shown in FIG. 1, the brake pedal 5 is provided with a brake switch 6 which is turned on when the brake pedal is depressed, and which is connected to the electronic control unit 10, to which the pressure sensors 24, 25 are connected as well. A shift position of the transmission 12 is detected to feed its output signal into the electronic control unit 10. Furthermore, wheel speed sensors 91–94 are provided for the wheels (FR), (FL), (RR), (RL), respectively, and connected to the electronic control unit 10 for feeding thereinto pulse signals proportional to the rotational speeds of the wheels, or the wheel speeds, respectively. The operation of the above-described first embodiment will be explained later with reference to FIG. 6, after a second embodiment of the present invention is explained hereinafter.

Figure 2:
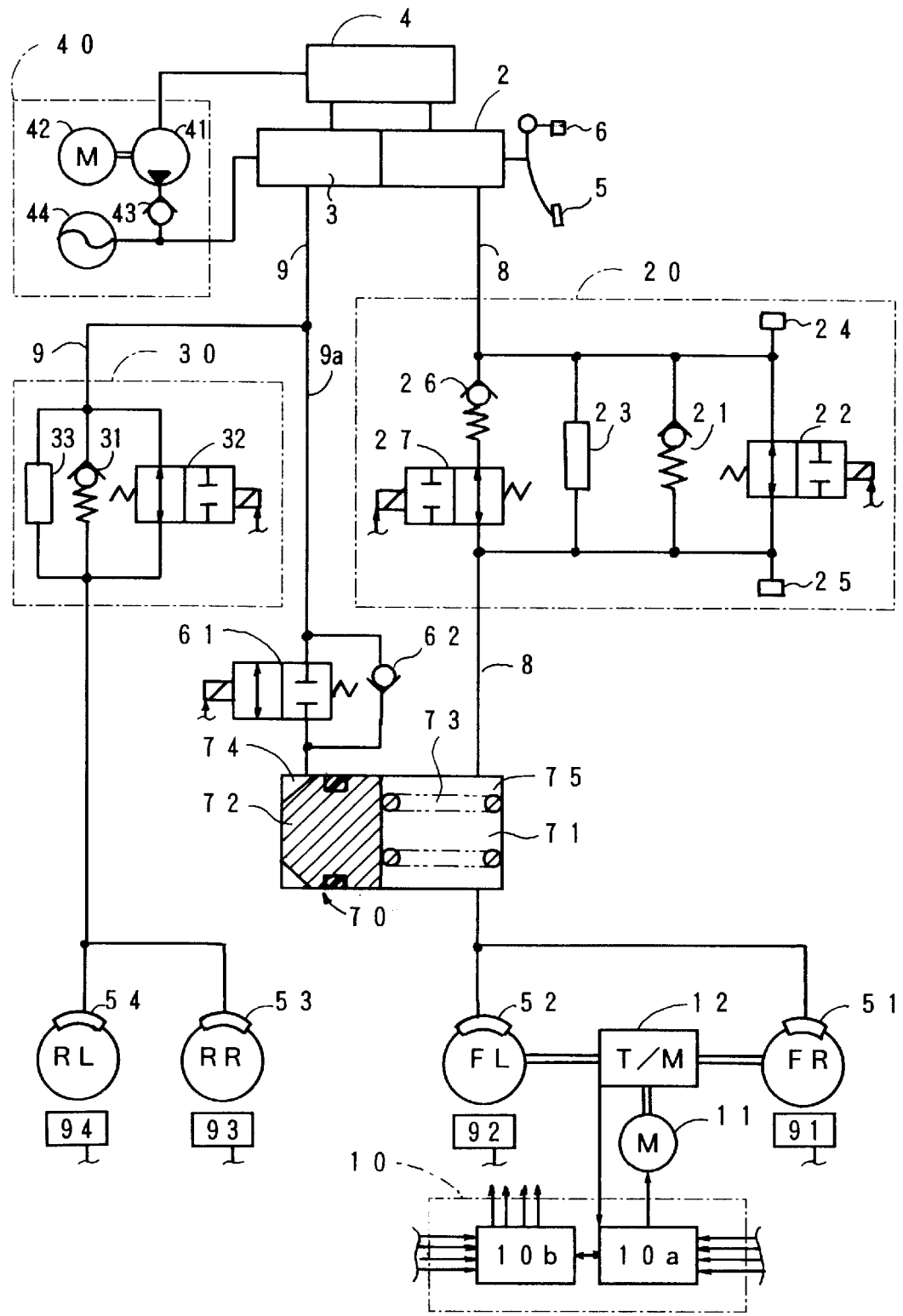
FIG. 2 is a block diagram illustrating a brake control system for an electrically operated vehicle according to a second embodiment of the present invention.

FIG. 2 illustrates the second embodiment of the present invention, wherein the master cylinder 2 is of a single type having a single pressure chamber, and wherein a regulator 3 is provided to serve as a dynamic pressure generator. In FIG. 2, substantially the same parts as the parts in FIG. 1 have the same reference numerals as those in FIG. 1. The regulator 3 is connected to an auxiliary power source 40, and both of them are connected to the low-pressure reservoir 4 to which the master cylinder 2 is connected. The auxiliary power source 40 includes a hydraulic pump 41 and an accumulator 44. The hydraulic pump 41 is driven by an electric motor 42 to pressurize the brake fluid in the reservoir 4 and discharge it into the accumulator 44 through a check valve 43. The electric motor 42 is activated when the pressure in the accumulator 44 is lower than a predetermined lower limit, and stopped when the pressure in the accumulator 44 exceeds a predetermined upper limit. Accordingly, the power pressure is supplied from the accumulator 44 into the regulator 3, which regulates the power pressure in response to a pilot pressure of the master cylinder pressure output from the master cylinder 2 to generate a regulated pressure in proportion to the master cylinder pressure, so as to be substantially the same pressure as the master cylinder pressure, like a known regulator. A part of the regulated pressure is provided for assisting or boosting the operation of the master cylinder 2. In addition, a modulator having a plurality of solenoid valves, which are omitted in FIG. 2, may be disposed in a pressure circuit and connected to the electronic control unit 10, whereby operations for an antiskid control, traction control, front-rear braking force distribution control, steering control by braking and the like can be performed.

The pressure limit changeover device 20 is disposed in the main passage 8 which communicates the master cylinder 2 with the front wheel brake cylinders 51, 52, as in FIG. 1, and the pressure limit changeover device 30 is disposed in the main passage 9 which communicates the regulator 3 with the second wheel brake cylinders 53, 54, as in FIG. 1. And, a sub-cylinder 70 is disposed in the main passage 8 between the pressure limit changeover device 20 and the front wheel brake cylinders 51, 52, and connected to an auxiliary passage 9a which is separated from the main passage 9. The sub-cylinder 70 includes a cylindrical housing 71 with an inner bore defined therein, and a piston 72 which is slidably received in the inner bore of the housing 71 to define therein a first pressure chamber 74 and a second pressure chamber 75 on the opposite sides of the piston 72. A spring 73 is disposed in the second pressure chamber 75 to urge the piston 72 to the left in FIG. 2 so as to expand the volume of the second pressure chamber 75 to its maximum volume, so that the volume of the first pressure chamber 74 is minimum.

The solenoid valve 61 is disposed on the auxiliary passage 9a which is connected to the first pressure chamber 74. In parallel with the solenoid valve 61, a check valve 62 is disposed. The solenoid valve 61 is of a normally closed two-port two-position electromagnetic valve, which is closed when it is in its inoperative condition, and opened to communicate the first pressure chamber 74 with the regulator 3 through the auxiliary passage 9a when it is in its operative condition. The check valve 62 is provided for allowing the brake fluid to flow from the sub-cylinder 70 to the regulator 3 and blocking the reverse flow.

According to the sub-cylinder 70, therefore, when the solenoid valve 61 is opened, the regulated pressure which is substantially equal to the master cylinder pressure is supplied to the first pressure chamber 74, and the wheel cylinder pressure is supplied to the second pressure chamber 75, so that the regulated pressure output from the regulator 3 and the wheel cylinder pressure in the wheel brake cylinder are fluidly separated. When the regulated pressure and the wheel cylinder pressure are not supplied to the first and second pressure chambers 74, 75, respectively, the piston 72 is placed at a position where the volume of the first pressure chamber 74 is minimum as shown in FIG. 1. When the regulated pressure is supplied from the regulator 3 to the first pressure chamber 74 through the solenoid valve 61 in its open position, the piston 72 is pushed in such a direction as to compress the second pressure chamber 75 against the biasing force of the spring 73, so that the pressurized brake fluid is discharged from the second pressure chamber 75 through the main passage 8 into the wheel brake cylinders 51, 52 to increase the pressure therein. In this case, the brake fluid will not be excessively supplied into the wheel brake cylinders 51, 52, because the amount of the brake fluid supplied into the wheel brake cylinders 51, 52 is limited to the maximum volume of the second pressure chamber 75. In the present invention, however, the regulated pressure may be supplied directly into the wheel brake cylinders 51, 52 when the solenoid valve 61 is opened, so that the sub-cylinder 70 may be omitted.

The second relief valve 26 is disposed in parallel with the first relief valve 21, and the solenoid valve 27 is disposed in series with the second relief valve 26 according to the present invention. It is preferable that the solenoid valve 27 is placed in the downstream of the second relief valve 26 so that the solenoid valve 27 is connected to the wheel brake cylinders 51, 52 through the sub-cylinder 70. If the solenoid valve 27 is placed in the upstream of the second relief valve 26 so that the solenoid valve 27 is connected to the master cylinder 2, there will be defined a space under 0 (zero) atmospheric pressure between the second relief valve 26 and the solenoid valve 27. Therefore, provided that the regulated pressure is supplied in the downstream of the second relief valve 26, when the solenoid valve 27 is opened, the master cylinder pressure will be varied due to the pressure difference between the upstream and downstream of the second relief valve 26 to cause a shock on the brake pedal 5. In order to avoid this shock, it is preferable that the solenoid valve 27 and the second relief valve 26 are arranged as shown in FIG. 2.

Figure 3:
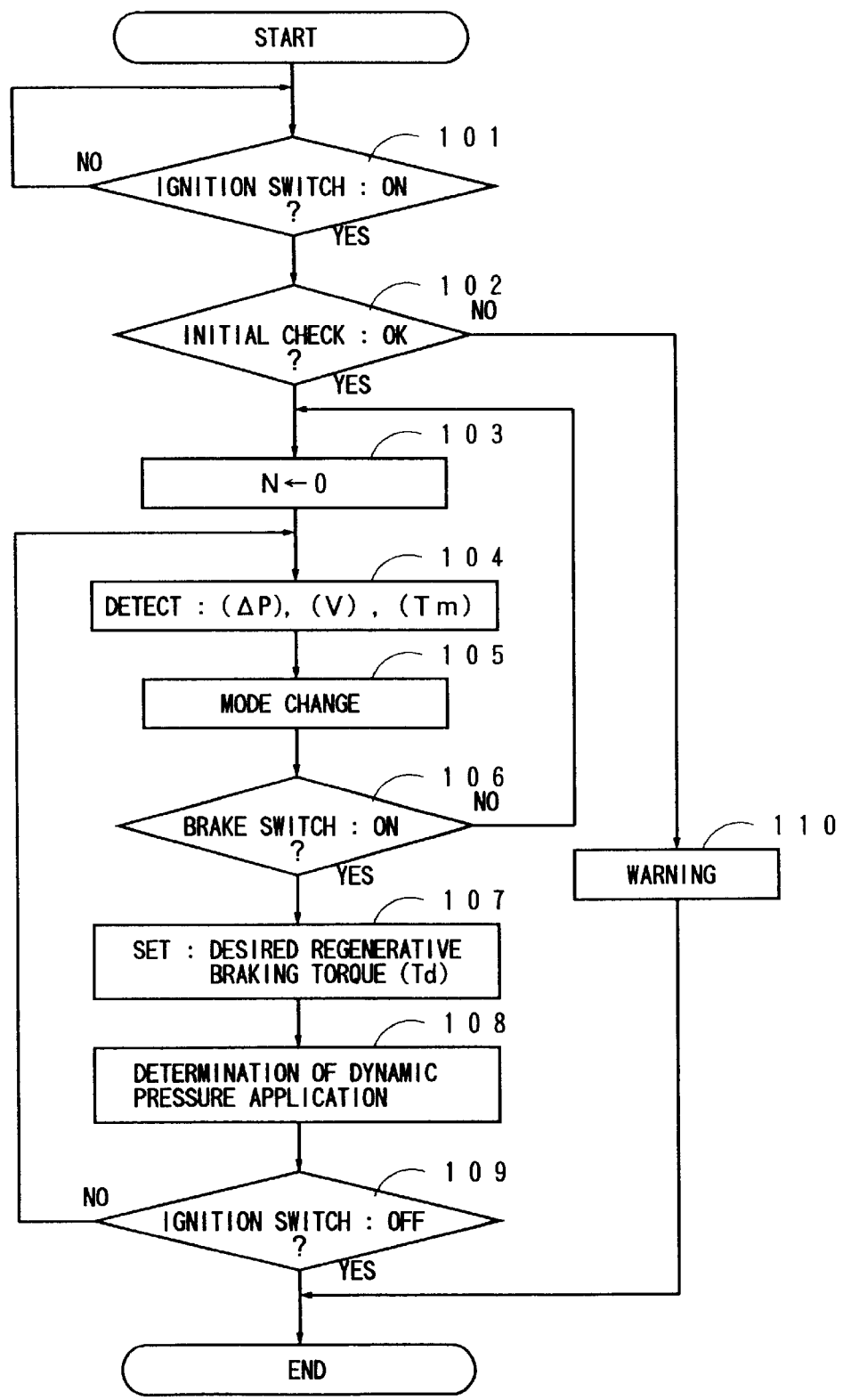
FIG. 3 is a flowchart showing a brake control operation according to the second embodiment of the present invention.
Figure 4:
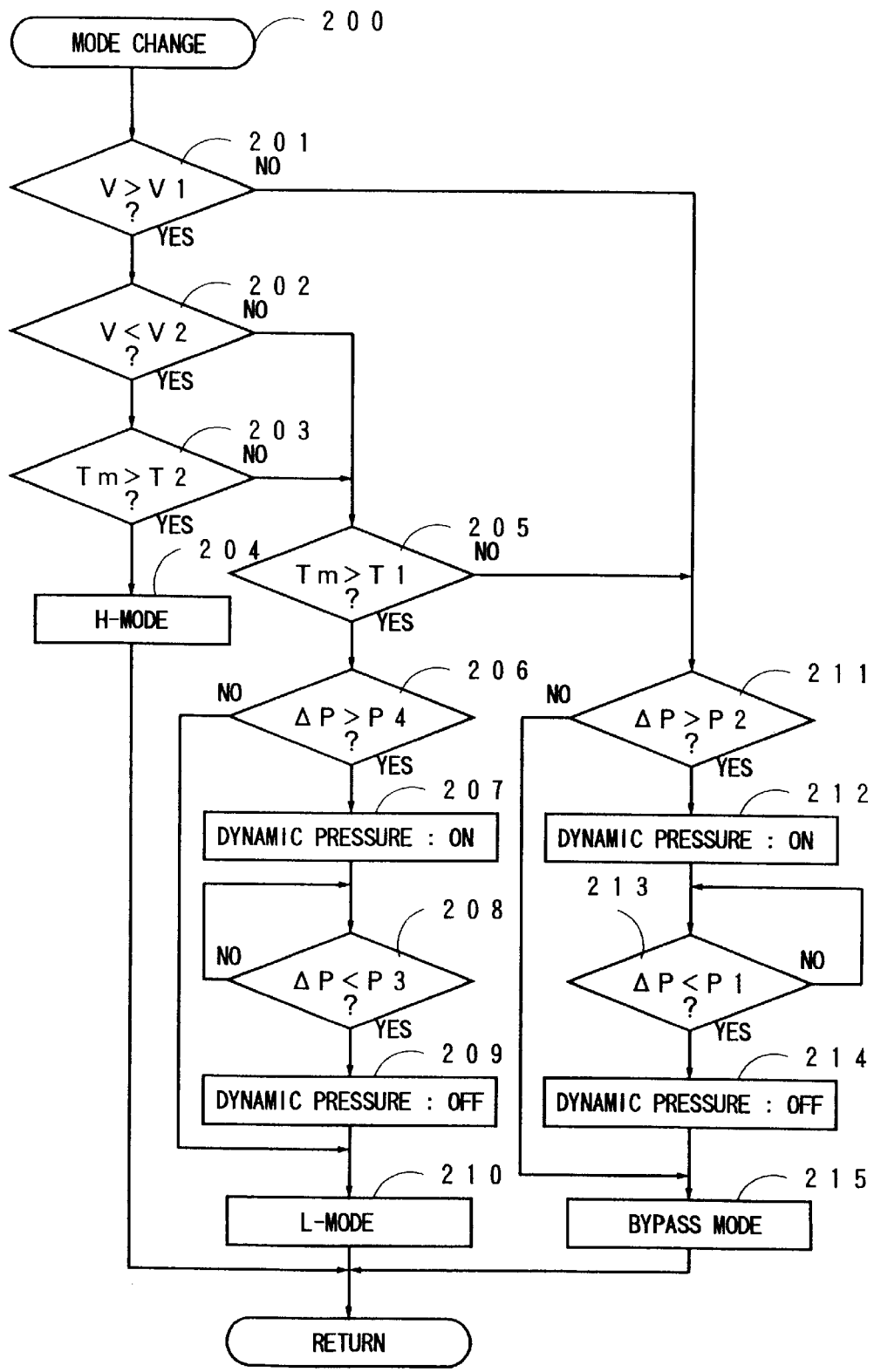
FIG. 4 is a flowchart showing a mode change operation according to the second embodiment of the present invention.
Figure 5:
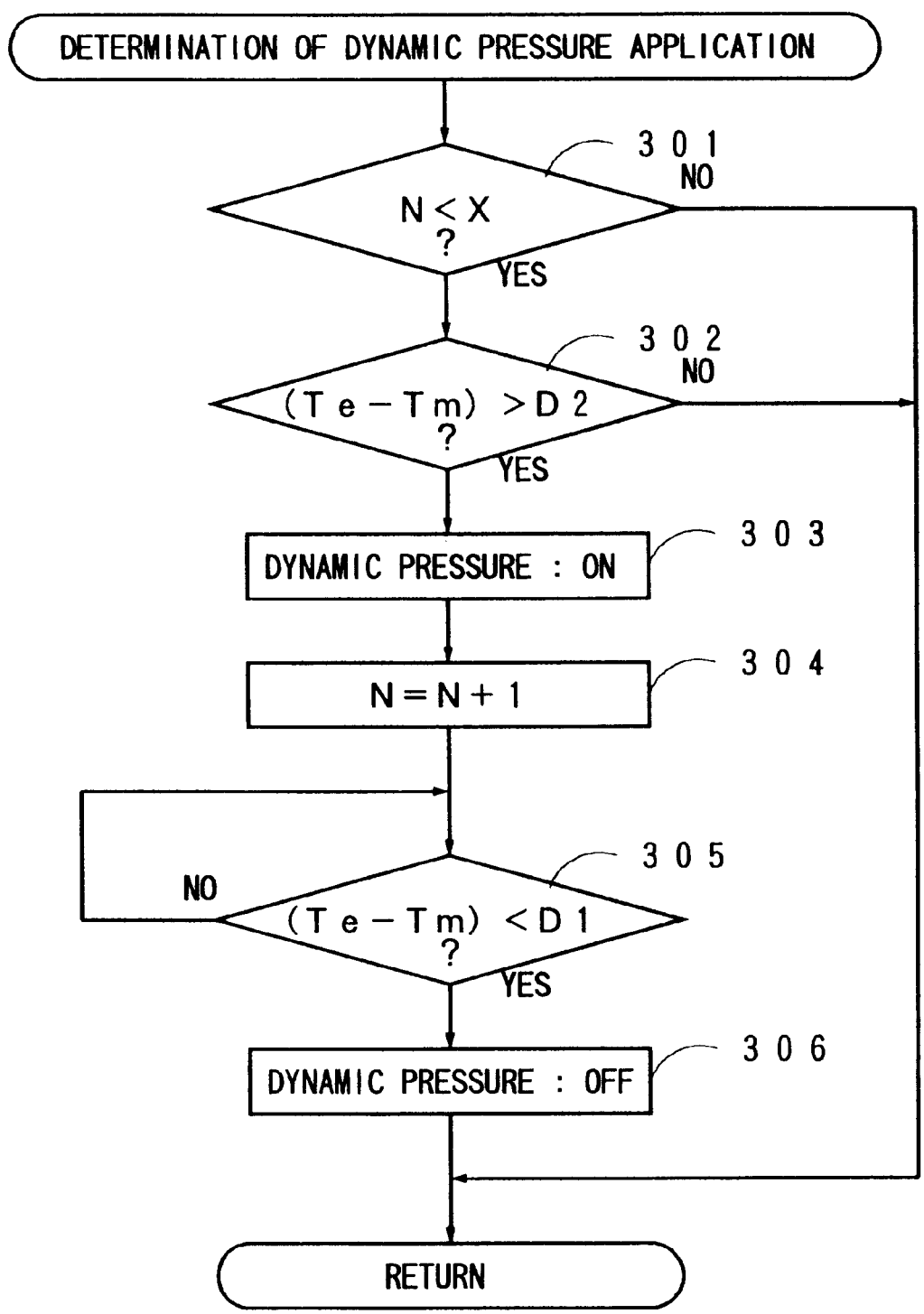
FIG. 5 is a flowchart showing a determination of dynamic pressure application according to the second embodiment of the present invention.

According to the brake control system as structured in FIG. 2, the hydraulic pump 41 is driven by the electric motor 42 to accumulate the power pressure in the accumulator 44 as described before. In the case where the solenoid valves are placed in the positions as shown in FIG. 2, when the brake pedal 5 is depressed, the master cylinder pressure is output from the master cylinder 2, and the regulated pressure is output from the regulator 3. Then, the brake control operation is initiated by the electronic control unit 10, so that the program corresponding to flowcharts as shown in FIGS. 3–5 is executed while the vehicle is moving.

When an ignition switch (not shown) is turned on at Step 101, the program proceeds to Step 102 where an initial check is executed. That is, the conditions of the electric motor 11, transmission 12 and battery (not shown) are detected to determine whether the condition for starting the regenerative braking operation has been fulfilled or not. For example, when the vehicle is moving at a very low speed, when the battery has been fully charged, when a malfunction occurs, or when the transmission 12 is shifted in its neutral position, it is determined that the condition for starting the regenerative braking operation has not been fulfilled. If it is determined that the condition for starting the regenerative braking operation has not been fulfilled, the program proceeds to Step 110 where a signal for prohibiting the regenerative braking operation is fed into the microcomputer 10a.

If the starting condition of the regenerative braking operation has been fulfilled, the program proceeds to Step 103 where a counted number in a dynamic pressure application counter, which will be described later, is cleared to be zero. Then, the program proceeds to Step 104 where a difference between the master cylinder pressure (Pm) and the wheel cylinder pressure (Pw), which are detected by the pressure sensors 24, 25, respectively, is calculated to provide a pressure difference ($\Delta P$) ($\Delta P = Pm - Pw$). A vehicle speed (V) is calculated on the basis of the wheel speeds detected by the wheel speed sensors 91–94, and a maximum torque for the possible regenerative braking operation (hereinafter, simply referred to as maximum torque (Tm)) is estimated in accordance with the condition of the motor 11. On the basis of the pressure difference ($\Delta P$), vehicle speed (V) and maximum torque (Tm), a mode change is made at Step 105, as will be explained later in detail. Then, the program proceeds to Step 106 where the condition of the brake switch 6 is determined. If it is determined that the brake switch 6 is turned on, the program proceeds to Step 107, but if it is determined that the brake switch 6 is turned off, the program returns to Step 103.

At Step 107, a necessary regenerative braking torque (Te) is calculated in accordance with a function of the pressure difference ($\Delta P$) (i.e., Te=f ($\Delta P$)), and the smaller one of the necessary regenerative braking torque (Te) and the maximum torque (Tm) is selected to provide a desired regenerative braking torque (Td). In accordance with the desired regenerative braking torque (Td), the electric motor 11 is actuated by the microcomputer 10a to obtain the same. The pressure difference ($\Delta P$) can be estimated on the basis of only the master cylinder pressure, or the stroke of the brake pedal 5 or the like. In these cases, the desired regenerative braking torque (Td) can be directly calculated without calculating the pressure difference ($\Delta P$). Then, the program proceeds to Step 108 where it is determined whether the dynamic hydraulic pressure output from the regulator 3, i.e., the regulated pressure, is to be applied to the system, or not, as will be described later in detail with reference to FIG. 5. Accordingly, the program returns to Step 104 to repeat the above-described steps until the ignition switch (not shown) is turned off at Step 109.

Referring to FIG. 4 which shows the mode change executed at Step 105 as shown in FIG. 3, the vehicle speed (V) is compared with a predetermined speed (V1) at Step 201. If the vehicle speed (V) is equal to or lower than the predetermined speed (V1), the program proceeds to Step 211 and Steps following it. If the vehicle speed (V) is greater than the predetermined speed (V1), the program proceeds to Step 202 where the vehicle speed (V) is compared with a predetermined speed (V2) which is higher than the predetermined speed (V1), i.e., V2>V1. If the vehicle speed (V) is lower than the predetermined speed (V2), the program proceeds to Step 203 where the maximum torque (Tm) is compared with a predetermined torque (T2). If the vehicle speed (V) is equal to or higher than the predetermined speed (V2), and if the maximum torque (Tm) is equal to or smaller than the predetermined torque (T2), the program proceeds to Step 205 and Steps following it. If the maximum torque (Tm) is greater than the predetermined torque (T2), the program proceeds to Step 204 where a high pressure difference mode (hereinafter referred to H-mode) is selected, so that the solenoid valves 22, 32 are energized to be placed in their closed positions, and the solenoid valve 27 is energized to be placed in its closed position.

At Step 205, the maximum torque (Tm) is compared with the predetermined torque (T1), (T1<T2). If the maximum torque (Tm) is equal to or smaller than the predetermined torque (T1), the program proceeds to Step 211 and Steps following it. If the maximum torque (Tm) is greater than the predetermined torque (T1), the program proceeds to Step 206 where the pressure difference ($\Delta P$) is compared with the predetermined pressure (P4). If the pressure difference ($\Delta P$) is greater than the predetermined pressure (P4), the program proceeds to Step 207 where the solenoid valve 61 is energized to be placed in its open position, so that the regulated pressure (dynamic pressure) is transmitted to the wheel brake cylinders 51, 52 through the sub-cylinder 70. Then, the solenoid valve 61 is held to be in its open position, until the pressure difference ($\Delta P$) is reduced to be smaller than a predetermined pressure (P3), (P3<P4), at Steps 208, 209. When the pressure difference ($\Delta P$) comes to be smaller than the predetermined pressure (P3), or the pressure difference $\Delta P$) comes to be equal to or smaller than the predetermined pressure (P4) at Step 206, the program proceeds to Step 210 where a low pressure difference mode (hereinafter referred to L-mode) is selected, so that the solenoid valves 22, 32 are energized to be placed in their closed positions, and the solenoid valve 27 is de-energized to be placed in its open position. If the solenoid valve 27 is de-energized to be opened from its closed position in the case where the pressure difference ($\Delta P$) is greater than the predetermined pressure (P4), the master cylinder pressure is greatly reduced thereby to cause the shock on the brake pedal 5. However, in the case where the pressure difference ($\Delta P$) is smaller than the predetermined pressure (P4), even if the solenoid valve 27 is opened from its closed position, the master cylinder pressure is not reduced so much as to cause the shock on the brake pedal 5.

Figure 8:
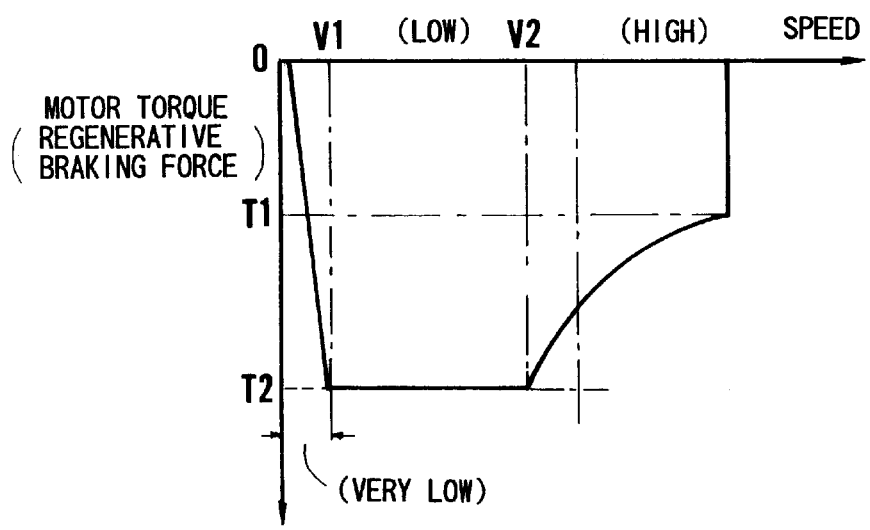
FIG. 8 is a diagram showing a braking force distribution in the braking operation and the hydraulic braking operation according to the embodiments of the present invention.

If the vehicle speed (V) is equal to or lower than the predetermined speed (V1), it is determined at Step 201 that the vehicle speed (V) is in a very low speed zone, then the program proceeds to Step 201 where the pressure difference ($\Delta P$) is compared with the predetermined pressure (P2). If the pressure difference ($\Delta P$) is greater than the predetermined pressure (P2), the program proceeds to Step 212 where the solenoid valve 61 is energized to be placed in its open position, so that the regulated pressure (dynamic pressure) is transmitted to the wheel brake cylinders 51, 52 through the sub-cylinder 70. Then, the solenoid valve 61 is held to be in its open position, until the pressure difference ($\Delta P$) is reduced to be smaller than a predetermined pressure (P1), (P1<P2), at Steps 213, 214. When the pressure difference ($\Delta P$) comes to be smaller than the predetermined pressure (P1), or the pressure difference ($\Delta P$) comes to be equal to or smaller than the predetermined pressure (P2) at Step 211, the program proceeds to Step 215 where a bypass mode is selected, so that the solenoid valves 22, 32 are de-energized to be placed in their open positions, and the solenoid valve 27 is de-energized to be placed in its open position. The relationship between the values as described above is shown in FIG. 8.

In lieu of determination made at Steps 208, 213, a time (t) for applying the dynamic pressure may be compared with a predetermined time (t0), and the regulated pressure may be transmitted to the wheel brake cylinders 51, 52 through the sub-cylinder 70 until the predetermined time (t0) will be elapsed, i.e., until t>t0 will be satisfied. If the solenoid valve 22 is de-energized to be opened from its closed position in the case where the pressure difference (ΔP) is greater than the predetermined pressure (P2), the master cylinder pressure is greatly reduced to cause the shock on the brake pedal 5. However, in the case where the pressure difference (ΔP) is smaller than the predetermined pressure (P2), even if the solenoid valve 22 is opened from its closed position, the master cylinder pressure is not reduced so much as to cause the shock on the brake pedal 5.

FIG. 5 shows the determination of the dynamic pressure application executed at Step 108 as shown in FIG. 3. It is determined at Step 301 whether a number (N) of the dynamic pressure application made during a single braking operation, which is counted by the dynamic pressure application counter, is smaller than a predetermined limit number (X), e.g., 2. If the number (N) is smaller than the limit number (X), the program proceeds to Step 302 where a difference between the necessary regenerative braking torque (Te) and the maximum torque (Tm) for the possible regenerative braking operation, i.e., (Te−Tm) is compared with a predetermined value (D2). When the difference (Te−Tm) is equal to or smaller than a predetermined value (D2), or the number (N) of the dynamic pressure application is equal to or greater than the limit number (X), e.g., 2, the program returns to the routine as shown in FIG. 3. Whereas, if the difference (Te−Tm) exceeds the predetermined value (D2), the program proceeds to Step 303 where the solenoid valve 61 is energized to be placed in its open position (dynamic pressure: on), so that the regulated pressure (dynamic pressure) is transmitted to the wheel brake cylinders 51, 52 through the sub-cylinder 70. Then, after the number (N) is incremented at Step 304, the program proceeds to Step 305 where the difference (Te−Tm) is compared with a predetermined value (D1), (D1<D2). If the difference (Te−Tm) comes to be smaller than the predetermined value (D1), the program proceeds to Step 306 where the solenoid valve 61 is de-energized to be placed in its closed position (dynamic pressure: off), supply of the regulated pressure to the sub-cylinder 70 is terminated, and the program returns to the routine as shown in FIG. 3. In lieu of determination made at Step 305, the time (t) for applying the dynamic pressure may be compared with the predetermined time (t0), and the regulated pressure may be transmitted to the wheel brake cylinders 51, 52 through the sub-cylinder 70 until the predetermined time (t0) will be elapsed, i.e., until t>t0 will be satisfied.

Figure 6:
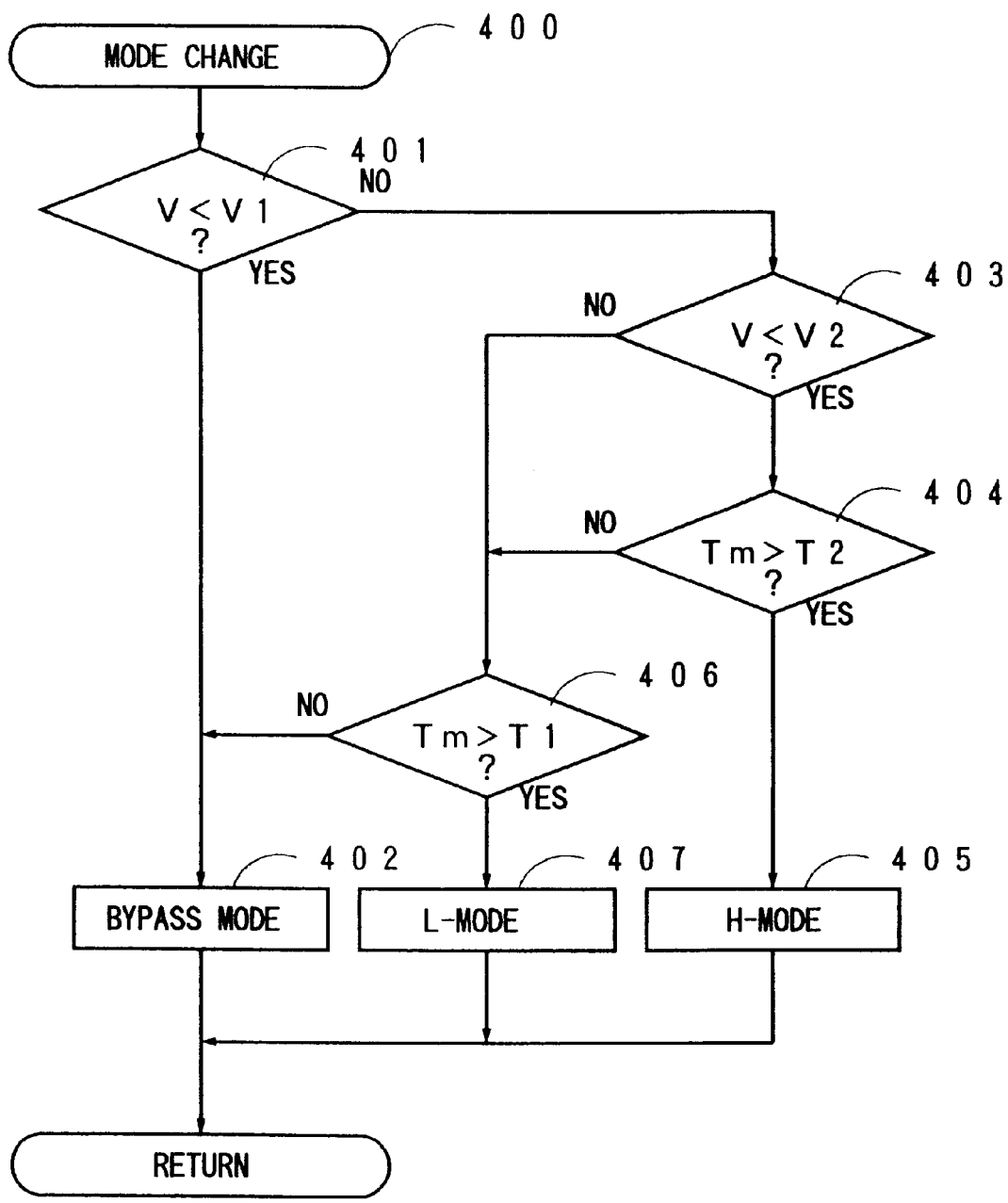
FIG. 6 is a flowchart showing a mode change operation according to the first embodiment of the present invention.

FIG. 6 relates to the mode change executed with respect to the first embodiment of the present invention, in which a main routine is substantially the same as the one corresponding to the flowchart as shown in FIG. 3 except Step 108. In other words, FIG. 6 shows the mode change executed at Step 105 as shown in FIG. 3, and corresponds to the flowchart as shown in FIG. 4 with the dynamic pressure application omitted therefrom. At Step 401, the vehicle speed (V) is compared with the predetermined speed (V1). If the vehicle speed (V) is equal to or greater than the predetermined speed (V1), the program proceeds to Step 403 and Steps following it. If the vehicle speed (V) is lower than the predetermined speed (V1), the program proceeds to Step 402 where the bypass mode is selected, so that the solenoid valves 22, 32 are de-energized to be placed in their open positions, and the solenoid valve 27 is de-energized to be placed in its open position. At Step 403, the vehicle speed (V) is compared with the predetermined speed (V2) which is higher than the predetermined speed (V1), i.e., V2>V1. If the vehicle speed (V) is lower than the predetermined speed (V2), the program proceeds to Step 404 where the maximum torque (Tm) is compared with a predetermined torque (T2). If the maximum torque (Tm) exceeds the predetermined torque (T2), the program proceeds to Step 405 where the high pressure difference mode (H-mode) is selected, so that the solenoid valves 22, 32 are energized to be placed in their closed positions, and the solenoid valve 27 is energized to be placed in its closed position. If the vehicle speed (V) is equal to or greater than the predetermined speed (V2), and if the maximum torque (Tm) is equal to or smaller than the predetermined torque (T2), the program proceeds to Step 406.

At Step 406, the maximum torque (Tm) is compared with the predetermined torque (T1), which is smaller than the predetermined torque (T2), i.e., T1<T2. If the maximum torque (Tm) exceeds the predetermined torque (T1), the program proceeds to Step 407 where the low pressure difference mode (L-mode) is selected, so that the solenoid valves 22, 32 are energized to be placed in their closed positions, and the solenoid valve 27 is de-energized to be placed in its open position. If the maximum torque (Tm) is equal to or smaller than the predetermined torque (T1), the program proceeds to Step 402 where the bypass mode is selected.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A brake control system for controlling a braking force applied to a wheel of an electrically operated vehicle, comprising:

an electric motor operatively connected to said wheel for rotating said wheel;

motor control means for controlling said electric motor to apply a rotating force to said wheel and apply a regenerative braking force to said wheel;

pressure generating means for pressurizing brake fluid stored in a reservoir in response to operation of a manually operated member to generate a hydraulic pressure;

a wheel brake cylinder operatively connected to said wheel for applying a hydraulic braking force to said wheel in response to at least the hydraulic pressure supplied thereto from said pressure generating means;

a main passage for communicating said pressure generating means with said wheel brake cylinder; and pressure limit changeover means disposed in said main passage for selectively providing one of at least a first pressure limit condition where the hydraulic pressure supplied from said pressure generating means to said wheel brake cylinder is controlled to be lower than the hydraulic pressure generated by said pressure generating means when said motor control means controls said electric motor to apply the regenerative braking force to said wheel, and a second pressure limit condition where the hydraulic pressure supplied from said pressure generating means to said wheel brake cylinder is controlled to be substantially equal to the hydraulic pressure generated by said pressure generating means when said motor control means controls said electric motor not to apply the regenerative braking force to said wheel, said pressure limit changeover means including;

first pressure limit means connected to said main passage for closing said main passage when the hydraulic pressure generated by said pressure generating means is lower than a first predetermined pressure, and opening said main passage when the hydraulic pressure generated by said pressure generating means exceeds the first predetermined pressure;

second pressure limit means connected to said main passage in parallel with said first pressure limit means for closing said main passage when the hydraulic pressure generated by said pressure generating means is lower than a second predetermined pressure which is lower than the first predetermined pressure, and opening said main passage when the hydraulic pressure generated by said pressure generating means exceeds the second predetermined pressure;

first valve means connected to said main passage in parallel with said first pressure limit means for opening or closing said main passage; and second valve means connected to said main passage in parallel with said first pressure limit means and in series of said second pressure limit means for opening or closing said main passage.

2. The brake control system as claimed in claim 1, further comprising;

vehicle speed detection means for detecting a vehicle speed of said electrically operated wheel, at least said second valve means opening or closing said main passage in response to the vehicle speed detected by said vehicle speed detection means.

3. The brake control system as claimed in claim 1, further comprising;

braking force detection means for detecting the regenerative braking force applied by said electric motor to said wheel, at least said second valve means opening or closing said main passage in response to the regenerative braking force applied to said wheel and detected by said braking force detection means.

4. The brake control system as claimed in claim 1, wherein said first pressure limit means is a first relief valve which is adapted to be closed until the hydraulic pressure generated by said pressure generating means reaches the first predetermined pressure and opened when the hydraulic pressure generated by said pressure generating means exceeds the first predetermined pressure, and which is adapted to control the hydraulic pressure in said wheel brake cylinder to be increased in proportion to the increase of the hydraulic pressure generated by said pressure generating means after the hydraulic pressure generated by said pressure generating means exceeds the first predetermined pressure.

5. The brake control system as claimed in claim 4, wherein said second pressure limit means is a second relief valve which is adapted to be closed until the hydraulic pressure generated by said pressure generating means reaches the second predetermined pressure which is lower than the first predetermined pressure and opened when the hydraulic pressure generated by said pressure generating means exceeds the second predetermined pressure, and which is adapted to control the hydraulic pressure in said wheel brake cylinder to be increased in proportion to the increase of the hydraulic pressure generated by said pressure generating means after the hydraulic pressure generated by said pressure generating means exceeds the second predetermined pressure.

6. The brake control system as claimed in claim 1, wherein said pressure generating means comprises;

an auxiliary power source for pressurizing the brake fluid stored in said reservoir irrespective of operation of said manually operated member to generate a power pressure;

dynamic pressure generating means for regulating the power pressure in response to operation of said manually operated member to generate a dynamic hydraulic pressure; and static pressure generating means for pressurizing the brake fluid stored in said reservoir in response to operation of said manually operated member to generate a static hydraulic pressure; and wherein said first pressure limit means is adapted to close said main passage when the static hydraulic pressure generated by said static pressure generating means is lower than the first predetermined pressure, and adapted to open said main passage when the static hydraulic pressure generated by said static pressure generating means exceeds the first predetermined pressure, and said second pressure limit means is adapted to close said main passage when the static hydraulic pressure generated by said static pressure generating means is lower than the second predetermined pressure, and adapted to open said main passage when the static hydraulic pressure generated by said static pressure generating means exceeds the second predetermined pressure.

7. The brake control system as claimed in claim 6, further comprising;

an auxiliary passage for fluidly connecting said dynamic pressure generating means to said main passage between said pressure limit changeover means and said wheel brake cylinder; and third valve means disposed in said auxiliary passage for opening or closing said auxiliary passage, said third valve means opening said auxiliary passage at least when a first condition for applying the regenerative braking force to said wheel is changed to a second condition for applying the hydraulic braking force to said wheel.

8. The brake control system as claimed in claim 7, wherein said second valve means is connected to said main passage in the downstream of said second pressure limit means.

9. The brake control system as claimed in claim 8, wherein said pressure limit changeover means is adapted to supply the hydraulic pressure generated by said dynamic pressure generating means to said main passage between said pressure limit changeover means and said wheel brake cylinder, when said first valve means is closed and said second valve means is opened from the closed condition thereof, and when said first valve means is opened from the closed condition thereof.

* * * * *